Sept. 12, 1933.  W. D. SARGENT  1,926,244
WHEELED TRACK LAYING UNIT
Filed June 18, 1930

Inventor:
William D. Sargent
By his Attorneys
Redding, Greeley, O'Shea & Campbell Patented Sept. 12, 1933

1,926,244

UNITED STATES PATENT OFFICE 1,926,244

WHEELED TRACK-LAYING UNIT

William D. Sargent, Newark, N. J.

Application June 18, 1930. Serial No. 461,886

2 Claims. (Cl. 305—8)

The present invention relates to vehicles and pertains, more specifically, to the crawler type of tractor or trailer, wherein increased traction and load supporting area upon the terrain is obtained by the use of an endless track which is mounted over a plurality of wheels carried by the unit to be supported. These crawler type units have long been known and used in the art and modifications thereof made wherein the units may be converted from a crawler type employing an endless track to a unit, the weight of which is supported directly upon a plurality of wheels without using an endless track.

It is with the latter type of vehicles that the present invention is concerned and the invention embodies, more specifically an improved convertible crawler unit wherein a degree of flexibility is provided between the endless track and the plurality of wheels over which the track is mounted, an auxiliary load supporting and strengthening device being provided to prevent excessive strains and stresses upon the endless track.

An object of the invention, accordingly, is to provide a unit of the above character, wherein an auxiliary load supporting element is provided when the stress impressed upon the track reaches a predetermined maximum.

A further object of the invention is to provide a device of the above character, wherein the endless track is formed with a supplementary track surface adapted to engage an auxiliary load supporting element when the strain upon the track reaches a predetermined maximum.

A further object of the invention is to provide a means for varying the spacing of the wheels of a unit of the above character.

A further object of the invention is to provide a means for taking up the slack in an endless track mounted over a plurality of wheels and tensioning the same to a predetermined degree.

A further object of the invention is to provide a crawler unit which is adapted for use in connection with a plurality of wheels provided with rubber tires, the track being formed with means to mount the same effectively over the wheels to prevent accidental removal thereof, such means further being utilized as an auxiliary load supporting device in combination with an auxiliary load supporting wheel.

Further objects, not specifically enumerated above, will be apparent as the invention is described in greater detail in connection with the accompanying drawing, wherein.

Figure 1:
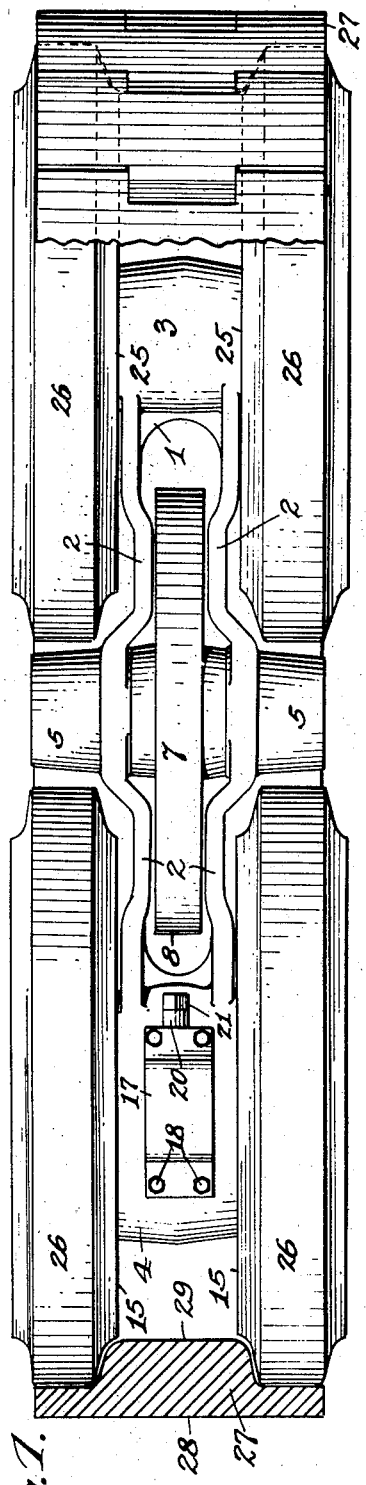
Figure 1 is a plan view, partly broken away and in section, showing a crawler unit constructed in accordance with the present invention.

Referring to the above drawing, a wheel supporting rock bar is shown at 1, being formed of parallel members 2 terminating in bearing, or journal members 3 and 4. At the central section of the bar, outwardly extending journal members 5 are formed on the respective side members 2, these journal members being formed with bearings 6 which receive the anchor tube or other shaft section carried by the vehicle which is to be supported upon the unit.

Between the side members 2, a wheel 7 is mounted, this wheel being journaled upon the anchor tube which is journaled in the bearing members 5. Wheel 7 is preferably formed with a periphery 8 of suitable character to resist the wear which is occasioned by the engagement of such wheel with the track to be described hereinafter. It has been found that a steel faced wheel serves very satisfactorily under these conditions.

At one end of the rock bar 1, shown in the drawing as the left hand end, the bearing member is enlarged and formed with a relatively large journal 9. In this journal, a bushing 10 is received, the bushing being provided with teeth 11 and an eccentrically formed journal 12. An axle 13 is received within the journal 12 and supported upon a bearing 14, this axle carrying wheels 15 upon the opposite ends thereof. The bearing member 4 is formed with a cut-away portion 16 upon which cap 17 is secured by means of bolts 18. The cap is formed with aligned bearings 19 for journalling a shaft 20, one end of the shaft being squared as at 21. Within a recessed portion 22 of cap 17, a worm 23 is keyed to shaft 20, this worm engaging the teeth 11 on the bushing 10. In this manner, the axis of shaft 13 may be moved toward or away from the axis of the journal member 3 by rotation of the worm 23 in the proper direction.

Journal member 3 carries a shaft 24 upon the opposite ends of which wheels 25 are secured. The wheels 15 and 25 are preferably provided with rubber tires 26 over which a track 27 is mounted. Track 27 is preferably formed of a plurality of links having an outer road engaging surface 28 and inwardly extending positioning members 29 intermediate the ends of the respective links. These positioning members are of such size as to fit between the tires 26 of the respective wheels and thus prevent the accidental removal of the track from the wheels.

Figure 2:
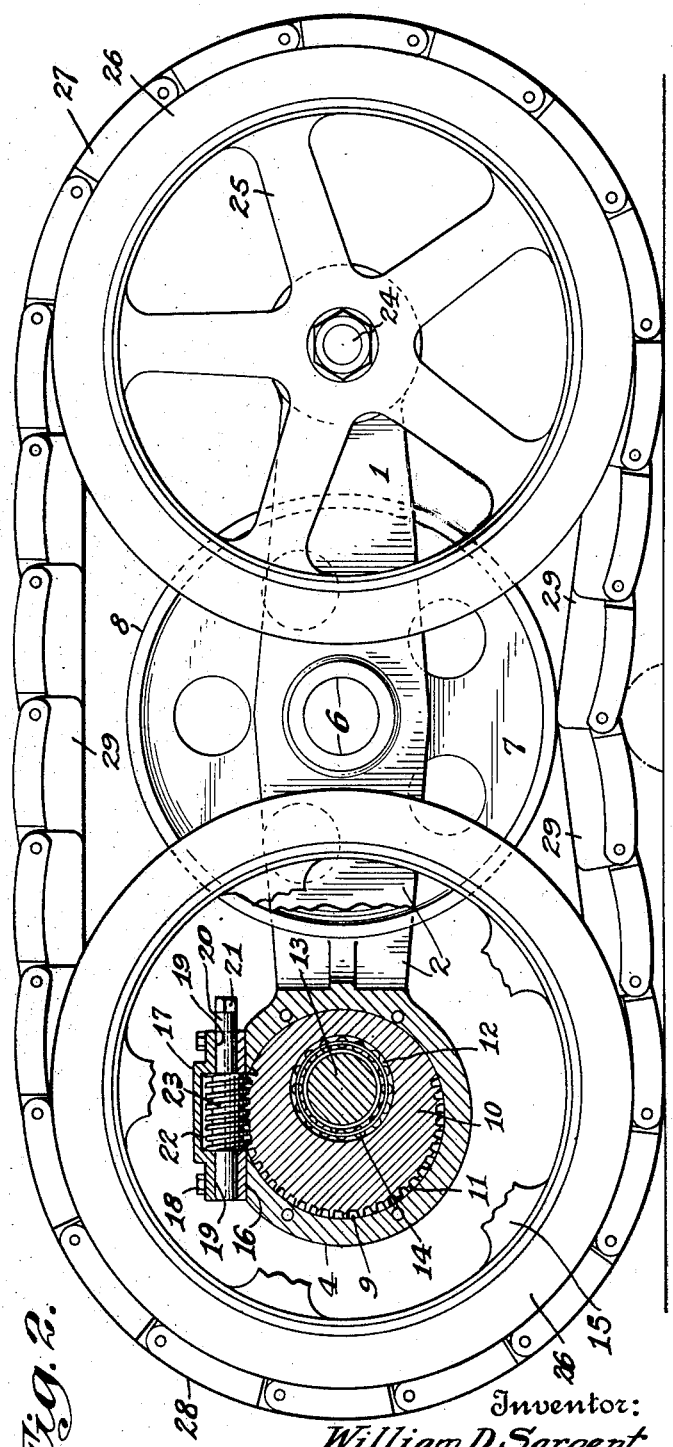
Figure 2 is a view in side elevation, partly broken away and in section, showing the crawler unit of Figure 1.

To serve as an additional load supporting element, the projecting portions 29 cooperate with the auxiliary wheel 7, as illustrated in Figure 2. When the crawler unit is operating over rough terrain, it frequently happens that the track mounts an irregular projection which forces the track upwardly when the projection is between the wheels. The strain on the track, due to this condition, is very severe and frequently breaks the connecting pins which secure the links of the track together. To prevent this excessive strain of the track, the wheel 7 is mounted as described hereinbefore, the inwardly projecting portions 29 of the track thus directly engaging the periphery 8 of the wheel to support the load of the vehicle upon the auxiliary wheel 7 and the irregularity over which the track has moved.

From the foregoing it will be seen that a crawler unit has been provided in combination with a plurality of wheels of a vehicle, the wheels preferably carrying rubber tires. By applying the endless track to the wheels in a well known manner, the traction and load supporting surface of the crawler unit is materially increased and a relatively high degree of flexibility afforded by reason of the fact that the rubber tires support the weight of the vehicle upon the endless track, a portion of which lies upon the terrain. The links may be of arcuate formation to conform to the outer periphery of the tires, thus fitting the tires more snugly and reducing the frictional losses due to the rubbing friction between the points of contact of the respective elements. The inwardly projecting portions 29 of the links, however, need not be formed with an arcuate surface, thus providing a flat track upon which the periphery of wheel 7 bears when the unit is passing over an extreme irregularity in the terrain. The facility with which the track may be mounted or dismounted will be readily apparent as will the facility with which the unit may be transformed from a crawler type to the type utilizing the wheels directly as the load supporting members. By rotation of the shaft 20, the spacing of the shafts 13 and 24 may be varied to compensate for the variation in lengths of the tracks under various conditions. In this manner a desired degree of tension may be set up initially in the track when it is mounted over the tires 26 and the stresses impressed upon the track effectively minimized by reason of the additional load supporting wheel 7.

While the invention has been described with specific reference to the accompanying drawing, it is not to be limited, save as defined in the appended claims.

I claim as my invention:

1. A vehicle wheel unit comprising an arm journaled for rocking movement intermediate its ends, pairs of load wheels of equal diameter mounted on the arm adjacent its ends, yielding rubber tires on the load wheels, an endless track mounted over the tires whereby upon concentration of the load intermediate the load wheels the tires yield to permit deformation of the track section between said wheels, an auxiliary load supporting wheel of less diameter than the tires of said load wheels journaled on the axis of rocking of said arm intermediate the load wheels and engageable with the track upon predetermined deformation of the said track section.

2. A vehicle wheel unit comprising an arm journaled for rocking movement intermediate its ends, pairs of load wheels of equal diameter mounted on the arm adjacent its ends, rubber tires on the load wheels, an endless track mounted over the tires whereby upon concentration of the load intermediate the load wheels the tires will yield to permit deformation of the track section between said wheels, an auxiliary load supporting wheel of less diameter than the tires of said load wheels, journaled on the axis of rocking of said arm intermediate the load wheels, and an inwardly projecting portion on the track disposed between the load wheels of the respective pairs and engageable with the auxiliary wheel upon predetermined deformation of the said track section.

WILLIAM D. SARGENT.